United States Patent
Turgeman et al.

(10) Patent No.: US 9,626,677 B2
(45) Date of Patent: *Apr. 18, 2017

(54) IDENTIFICATION OF COMPUTERIZED BOTS, AND IDENTIFICATION OF AUTOMATED CYBER-ATTACK MODULES

(71) Applicant: BioCatch Ltd., Tel Aviv (IL)

(72) Inventors: Avi Turgeman, Cambridge, MA (US); Itai Novick, Rehovot (IL)

(73) Assignee: BioCatch Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/198,199

(22) Filed: Jun. 30, 2016

(65) Prior Publication Data

US 2016/0306974 A1   Oct. 20, 2016

Related U.S. Application Data

(63) Continuation-in-part of application No. 14/736,287, filed on Jun. 11, 2015, and a continuation-in-part of (Continued)

(51) Int. Cl.
*H04L 29/06* (2006.01)
*G06Q 20/40* (2012.01)
(Continued)

(52) U.S. Cl.
CPC ......... *G06Q 20/4014* (2013.01); *G01R 29/26* (2013.01); *G06F 3/0482* (2013.01); (Continued)

(58) Field of Classification Search
CPC .................................................. G06Q 20/4014
See application file for complete search history.

(56) References Cited

U.S. PATENT DOCUMENTS

2008/0301808 A1* 12/2008 Calo .................. G06F 21/55
  726/23
2009/0199296 A1*  8/2009 Xie .................... G06F 21/316
  726/23
(Continued)

FOREIGN PATENT DOCUMENTS

EP   2610776   7/2013

OTHER PUBLICATIONS

Provos, Niels, et al. "The Ghost in the Browser: Analysis of Web-based Malware." HotBots 7 (2007): 4-4.*
(Continued)

*Primary Examiner* — Shawnchoy Rahman
(74) *Attorney, Agent, or Firm* — Eitan, Mehulal & Sadot

(57) ABSTRACT

Devices, systems, and methods of detecting whether an electronic device or computerized device or computer, is being controlled by a legitimate human user, or by an automated cyber-attack unit or malware or automatic script. The system monitors interactions performed via one or more input units of the electronic device. The system searches for abnormal input-user interactions; or for an abnormal discrepancy between: the input-unit gestures that were actually registered by the input unit, and the content that the electronic device reports as allegedly entered via such input units. A discrepancy or abnormality indicates that more-possibly a malware or automated script is controlling the electronic device, rather than a legitimate human user. Optionally, an input-output aberration or interference is injected, in order to check for manual corrective actions that only a human user, and not an automated script, is able to perform.

21 Claims, 3 Drawing Sheets

Related U.S. Application Data application No. 14/325,394, filed on Jul. 8, 2014, now Pat. No. 9,547,766, and a continuation-in-part of application No. 15/194,593, filed on Jun. 28, 2016, and a continuation-in-part of application No. 14/325,393, filed on Jul. 8, 2014, now Pat. No. 9,531,733, and a continuation-in-part of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942.

(60) Provisional application No. 62/190,264, filed on Jul. 9, 2015, provisional application No. 61/843,915, filed on Jul. 9, 2013, provisional application No. 61/417,479, filed on Nov. 29, 2010.

(51) Int. Cl.
  *G01R 29/26* (2006.01)
  *G06F 3/0482* (2013.01)
  *G06F 21/31* (2013.01)
  *G06F 21/55* (2013.01)
  *G06F 3/0484* (2013.01)
  *G06F 21/12* (2013.01)

(52) U.S. Cl.
  CPC ........ *G06F 3/04842* (2013.01); *G06F 21/121* (2013.01); *G06F 21/316* (2013.01); *G06F 21/552* (2013.01); *G06Q 20/4016* (2013.01); *H04L 63/08* (2013.01); *H04L 63/126* (2013.01); *H04L 63/1441* (2013.01); *G06F 2221/2133* (2013.01); *H04L 2463/082* (2013.01); *H04L 2463/144* (2013.01)

(56) References Cited

U.S. PATENT DOCUMENTS

| | | | | |
|---|---|---|---|---|
| 2011/0023115 | A1* | 1/2011 | Wright | G06F 21/552 726/22 |
| 2011/0113388 | A1* | 5/2011 | Eisen | G06F 21/32 715/856 |
| 2011/0251823 | A1* | 10/2011 | Davis | G06Q 30/02 702/181 |
| 2012/0096555 | A1 | 4/2012 | Mahaffey | |
| 2014/0250538 | A1* | 9/2014 | Rapaport | G06F 21/31 726/28 |
| 2014/0344927 | A1 | 11/2014 | Turgeman et al. | |
| 2015/0213251 | A1* | 7/2015 | Turgeman | G06F 21/36 726/7 |
| 2017/0048272 | A1* | 2/2017 | Yamamura | H04L 63/1466 |

OTHER PUBLICATIONS

Huang, Yao-Wen, et al. "Web application security assessment by fault injection and behavior monitoring." Proceedings of the 12th international conference on World Wide Web. ACM, 2003.*
International Search Report for application PCT/IB2016/054064 dated Nov. 21, 2016.

* cited by examiner

IDENTIFICATION OF COMPUTERIZED BOTS, AND IDENTIFICATION OF AUTOMATED CYBER-ATTACK MODULES

CROSS-REFERENCE TO RELATED APPLICATIONS

This application claims priority and benefit from U.S. provisional patent application No. 62/190,264, filed on Jul. 9, 2015, which is hereby incorporated by reference in its entirety.

This application is a Continuation-in-Part (CIP) of U.S. patent application Ser. No. 14/736,287, filed on Jun. 11, 2015, which is hereby incorporated by reference in its entirety.

This application is a Continuation-in-Part (CIP) of U.S. patent application Ser. No. 14/325,394, filed on Jul. 8, 2014, which is hereby incorporated by reference in its entirety.

This application is a Continuation-in-Part (CIP) of U.S. patent application Ser. No. 15/194,593, filed on Jun. 28, 2016, which is hereby incorporated by reference in its entirety.

This application is a Continuation-in-Part (CIP) of U.S. patent application Ser. No. 14/325,393, filed on Jul. 8, 2014, which is hereby incorporated by reference in its entirety.

The above-mentioned U.S. patent application Ser. No. 14/325,393 claims priority and benefit from U.S. provisional patent application No. 61/843,915, filed on Jul. 9, 2013, which is hereby incorporated by reference in its entirety.

The above-mentioned U.S. patent application Ser. No. 14/325,393 is a Continuation-in-Part (CIP) of U.S. patent application Ser. No. 13/922,271, filed on Jun. 20, 2013, now U.S. Pat. No. 8,938,787, which is hereby incorporated by reference in its entirety. The above-mentioned U.S. patent application Ser. No. 13/922,271 is a Continuation-in-Part (CIP) of U.S. patent application Ser. No. 13/877,676, filed on Apr. 4, 2013, now U.S. Pat. No. 9,069,942; which is a National Phase filing of PCT International Application number PCT/IL2011/000907, filed on Nov. 29, 2011, published as International Publication number WO/2012/073233; which claims priority and benefit from U.S. provisional patent application No. 61/417,479, filed on Nov. 29, 2010; and all the above-mentioned patent applications are hereby incorporated by reference in their entirety.

FIELD

The present invention is related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include devices, systems, and methods of detecting whether an electronic device or computerized device or computer, is being controlled by a legitimate human user, or by an automated cyber-attack unit or malware or automatic script. For example, the system monitors interactions performed via one or more input units of the electronic device. The system searches for abnormal input-user interactions; or for an abnormal discrepancy between: the input-unit gestures that were actually registered by the input unit, and the content that the electronic device reports as allegedly entered via such input units. A discrepancy or abnormality indicates that more-possibly a malware or automated script is controlling the electronic device, rather than a legitimate human user. Optionally, an input-output aberration or interference is injected, in order to check for manual corrective actions that only a human user, and not an automated script, is able to perform.

The present invention may provide other and/or additional benefits or advantages.

DETAILED DESCRIPTION OF THE PRESENT INVENTION

Figure 1:
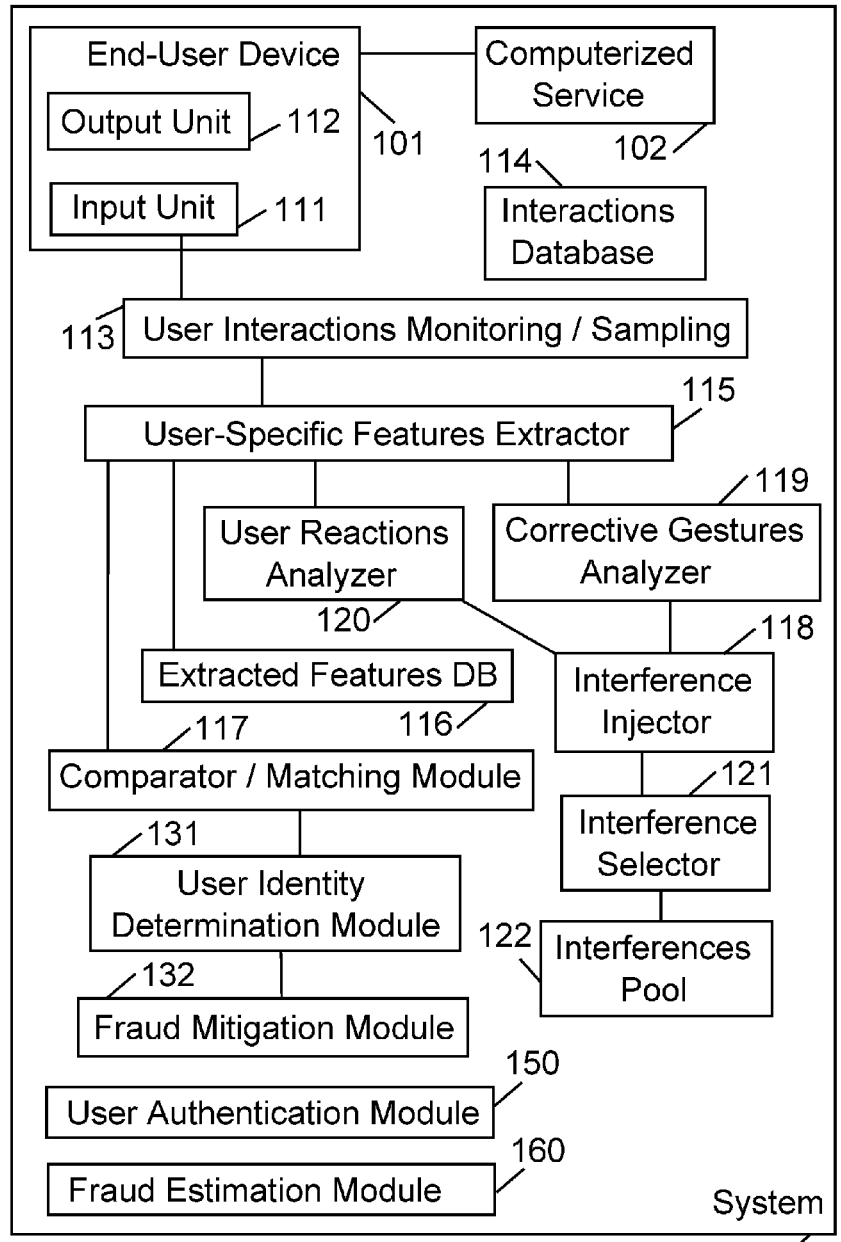
FIG. 1 is a schematic block-diagram illustration of a system, in accordance with some demonstrative embodiments of the present invention.

The present invention comprises systems, devices, and methods to enable detection (or determination, or estimation) of a "bot" or malicious automatic script or malware or a cyber-attack module or unit or computerized module, which is produces or generates or imitates human-like user-interaction data that resembles (or is posing as) human utilization of mouse, keyboard, touch-screen, touch-pad, or other input units of an electronic device or computing device or computer.

The Applicants have realized that it may be beneficial to construct and deploy a "bot" detector, or other malware detection module or unit that operates automatically and/or autonomously, in a generic manner (e.g., not necessarily searching for fingerprints of a particular already-known "bot" or specific already-known malware); and which is able to detect newly-devised "bots" or malware modules that are not yet known to security providers, and/or that were not yet analyzed by security research labs.

The Applicants have realized that in addition to a generic detection module(s), particular detection module(s) or unit(s) may be constructed and deployed in order to complement and/or fine-tune the detection process, and/or in order to reduce or eliminate the false-positive errors or the false-negative errors or other statistical errors of the generic detector module(s).

In some implementations, one or more "passive" methods may be utilized, to monitor or track user behavior and/or user interactions with a computerized service and/or with an electronic device; and to detect possible fraud or cyber-attack that involves a malware or a script or a "bot" that simulates or emulates keystrokes or mouse-movements or mouse-events or mouse-clicks or other input-unit-events (e.g., performed via a touch-pad, a touch-screen, or the like).

Such passive detection methods may comprise, for example: (a) detection of rapid "jumps" in mouse-pointer movement or on-screen-pointer movement (e.g., possibly deriving from an emulated mouse that is used by a malware module, which causes some of the mouse-pointer or on-screen-pointer movements to be non-smooth or non-continuous, or to include "gaps" or "jumps" or "on-screen jumps"); (b) detection of two mouse-clicks or two taps, that were performed at two different locations or on-screen locations, without detecting any (or sufficient) mouse-movement between them, or without detecting any (or sufficient) on-screen-pointer movement between them, which typically derives from emulated or simulated non-complete mouse operations; (c) abnormal or missing sequences of keyboard events, for example, keystrokes or typing that include only key-up event(s) and no key-down event(s), or vice versa, or non-identical numbers of key-up events compared to key-down events, or other discrepancy among keyboard-related events (key-down, key-up, key being held, key release) or their timing or their number or their sequence, which may indicate an emulated or simulated keyboard output, or may indicate that an automated script is trying to emulate or simulate (or is posing as) a human user; (d) detection of abnormal gaps or "jumps" among keyboard events; (e) detection of differences between the sampling rate of keyboard events and/or mouse events, or significant difference between their sampling rates, or abnormal changes in their sampling rate(s), possibly indicating that emulated or simulated output-data is generated (e.g., locally by a local attacker that immediately controls an adjacent co-located computing device; or remotely by a Remote Access attacker which may utilize a Remote Access Trojan (RAT) or other remote-access malware), rather than genuine local data produced locally by human interactions with actual input units; (f) detection of spoofing or modification or changing or replacement of data, at the User Interface level, derived from a malware module replacing or manipulating data that is being sent from the client-device to a remote server.

In some embodiments, the system may utilize a process that comprises passive detection method(s) and/or active detection method(s), to detect emulated or simulated or scripted "users" or bots or malware. Such process may comprise, for example: (a) detection of the form or field or page that is associated with the possible fraudulent operation or transaction, optionally by utilizing contextual mapping or contextual tagging or contextual analysis of UI elements or other content elements; (b) detection of submission of data by the end-user device even though no end-user input-unit activity is observed (or, even though a mismatching input-unit activity is observed); (c) detection of replacement of data or text, at the interface level (e.g., due to code injection); (d) detection of replacement of data or text, at the communication-layer level (e.g., by comparing the data that is captured by the security module added to a web-page or application, against the data that is actually received by the remote server of the target service).

Some implementations may detect advanced malware or "bots" or automated scripts that emulate or simulate user-interaction/input-unit data or signals. Optionally, the detection may take into account Contextual analysis of data, content, User Interface (UI) elements, forms, fields, and other page-components, in order to attribute a suitable risk-level to the interactions being tracked.

In some implementations, the system may inject or introduce or generate an input/output interference or an on-screen anomaly or abnormality or interference or irregularity, or other discrepancy between actions (e.g., gestures, movements, click-events, type-events, tilting, orienting, accelerating, or other operations) that the user actually performs via the input unit(s) and the reaction or feedback that is presented on the screen or that is otherwise exhibited by the electronic device; and the system may track whether corrective manual actions are performed via the input units. The introduction of the input/output interference or the on-screen interference or the input-unit interference, may enable the system to classify the user into a group of possible "bots" (or scripts, or malware), since such "bots" would not react to an on-screen interference that only a human observer may be able to see and/or react to; whereas most human users would see or would feel the discrepancy or abnormality and would perform corrective actions. This may enable the system to generate a High Risk Users List, which is a list of all the users that did not respond to the injected interference or abnormality, a list that would most probably include all the "bots" or malware modules that operated at that web-page or form or field or UI component, a list that may have a False Negative error rate of zero or near-zero. Accordingly, this may enable the system to identify "bots" or malware modules that are not aware yet of the system's fraud protection methods, and/or that are not pre-programmed to attempt to react to such injected abnormalities or interferences. Subsequently, passive fraud detection methods may be utilized (e.g., without injecting an interference), as part of the fine-tuning of the fraud detection process, to identify a particular malware of type-of-malware; and this, in turn, may allow a reduction or dilution of the above-mentioned High Risk Users List to remove from it human users and to dilute the list to include only malware modules, thereby achieving or attempting to achieve a False Positive error rate of zero or near-zero.

Some embodiments of the present invention may utilize automatic or automated or autonomous mapping of contextual properties of website components or webpage components (or application components, or User Interface (UI) components, or Graphical UI (GUI) components), for security purposes and/or for fraud-detection purposes and/or for fraud mitigation purposes and/or for risk assessment purposes.

The terms "webpage" or "web-page" as used herein may optionally comprise, for example, an entire website or Internet domain (e.g., www.Example.com); an entire sub-domain (e.g., Mobile.Example.com); a portion of a website, a portion of a domain, a portion of a sub-domain; a group or set or batch of inter-related web-pages; a group or set or batch of web-pages; a series of web-pages that are typically accessed from the same domain or that are hosted under the same domain, or that are co-hosted on the same server or a co-located server; a frame or a portion within a webpage; a content of web-page as displayed or presented via a web browser; the source code of a web-page; content of a web-page; an application or a mobile application or "app"; a page or form or tab that is part of a web-page or web-site or "app" or application; and/or other suitable structure.

The Applicants have realized that the interactions of a user with a computerized service (e.g., a website or an online service), may be monitored, logged and tracked in order to detect user-specific characteristics that may enable the system to differentiate among users, or that may enable the system to differentiate between a legitimate user (e.g., a genuine user who is the account-owner, an authorized user)

and an attacker (or impersonator or "fraudster" or imposter or impostor or other illegitimate user).

The Applicants have further realized that the process of reaching a determination of fraud or non-fraud (or, the process of generating a fraud-possibility score or indicator), with regard to a particular transaction or operation, may comprise taking into account the Context of the operation or transaction being performed and/or the UI or GUI elements or the steps that are being utilized for performing the transaction.

For example, a user-behavior characteristic that indicates possible fraud, may not be sufficient to generate a fraud notification if the user is merely browsing the website and viewing the account balance; but he same or a similar user-specific behavioral characteristics may be sufficient for generating a fraud notification if the user engages in higher-risk or increased-risk or high-risk activity or operation (e.g., the user is submitting a command to wire funds from the logged-in account to a different account or to a third-party beneficiary).

Accordingly, the present invention may perform automatic scanning and mapping of the website (or webpage, or application, or service) that is being protected or being monitored or that is expected or intended to be monitored for fraudulent activity. The mapping process may identify UI elements or GUI elements (e.g., buttons, drop-down menus, selection boxes, data fields) and other elements (e.g., entire page or web-page; a tab or area in a website; a tab or area in a webpage; a tab or area in an application; an entire form; a sequence of operations or forms or pages), and may further classify or categorize or map such elements based on their context, based on their associated risk potential, or based on the level of damage that may occur if such element is fraudulently utilized, or based on the level of sufficiency of possible-fraud that would be required in order to trigger a fraud notification.

In some implementations, an automatic or semi-automatic Contextual Mapping Module may examine elements, forms, pages, fields, UI elements, GUI elements, text items, images, animations, video segments, audio segments, and/or other components of a website or webpage or application or service that is being protected against fraud (or that the system is preparing towards fraud protection). The Contextual Mapping Module may automatically identify and/or classify such elements as high-risk elements, low-risk elements, and/or other suitable risk-related classifications (e.g., medium-risk elements, risk-natural elements, no-risk elements, unknown-risk-level elements, increased risk-level elements, reduced risk-level elements).

The contextual mapping information of such elements may be stored in a lookup table or database or other data-structure, or as a fraud risk-level parameter associated with each element; and may subsequently be utilized as a factor or a parameter in the process of determining whether or not an operation or a transaction (or a set of operations) is fraudulent or legitimate, or in the process of assigning or generating a total fraud-possibility score for a transaction or for on operation or set of operations.

In a demonstrative implementation, the Contextual Mapping Module may identify or may isolate UI elements (e.g., a "submit" button, or a free-text field); and may assign a risk-level or a security-importance level or a security-exposure level associated with each such element. For example, the Contextual Mapping Module may detect a "submit wire transfer command" button on a "submit wire transfer" page or form or tab, and may assign High Risk indicator to that UI element and/or to UI elements that are located on the same page, and/or to user-operations that would be performed by utilizing that UI element or in relation to the page (or form) in which the UI element is located.

In contrast, the Contextual Mapping Module may detect a more "benign" UI element or form or page or website-element, such as a "Show Frequently Asked Questions (FAQ)" link or button, or a "Find Branch Location" button or link or form, that are generally associated with reduced risk or reduced exposure (or, no security risk, or no security exposer), and may tag or map them accordingly as reduced-risk or low-risk elements or pages or forms.

In some embodiments, the Contextual Mapping Module may tag or map or assign exposure values or fraud-relatedness values to such elements in an automatic or semi-automatic manner, and not manually and not by depending on manual (human) review of each element. For example, the Contextual Mapping Module may take into account certain keywords or words or terms in order to classify or tag such UI elements, and may compare the text or content of such UI elements to a pre-defined list of high-risk terms and/or to a pre-defined list of low-risk terms. For example, "wire" or "transfer" or "wire funds" or "wire transfer" may trigger higher-risk tagging; whereas "Contact Us" or "F.A.Q." or "Branch Locations" may trigger lower-risk tagging; a form that mention "please re-enter your password for additional security" may trigger higher-risk tagging; or the like.

In some embodiments, the Contextual Mapping Module may utilize a multi-step process, that may include, for example: (a) analysis of information and prior contextual mapping and prior contextual tagging, that had already been performed (e.g., manually, by human operators, or by automatic means) to elements or forms or contents of previously-mapped websites in general or to previously-mapped websites in a particular field (e.g., banking websites; online retailers; brokerage websites); (b) characterization of the methodology of automatic contextual mapping or automatic contextual tagging, that would cover or capture correctly the already-tagged or already-mapped elements from other websites or other web-pages; (c) implementation and deployment of machine-readable instructions or code, that reflects automatic process or automatic logic for carrying out the identified methodology; (d) experimental running or execution of the code on a newly-examined website that has not been part of the sample of websites (or web-pages) that were utilized in step (a) above; and (e) examining the results of the experimental run cycles, evaluation of the automatic mapping results, and fine-tuning and modification of the code to improve the process of contextual-based mapping or tagging.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a fitness bracelet (e.g., similar to FitBit or Jaw-Bone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); particular sequences of keys or characters that the user enters more rapidly (or more slowly) relative to other characters or sequences; particular manner or pattern in which the user navigates within fields or within a page or an application; and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation, or input-output interference, or input/output anomaly) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference or anomaly or aberration. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

System 100 may comprise a user authentication module 150 which may enable system 100 and/or computerized service 102 and/or end-user device 101 to perform user authentication, or to authenticate or verify or confirm the identity of a user of end-user device 101 (or of computerized service 102), and/or to utilize the unique behavior and/or gestures and/or reactions of the user as a user-identifying feature (e.g., which may be used by the system to authorize a log-in, or may authorize access, or may authorize a password recovery or a password reset process). The user authentication module 150 may be able to distinguish between (i) a legitimate user, or genuine user, or authorized user, or genuine account-owner; and (ii) an illegitimate user or attacker or cyber-attacker or impostor or imposter, a human attacker, a non-human attacker (e.g., a malware or automatic script or automated script or "bot") or other illegitimate user.

In some demonstrative embodiments of the present invention, system 100 may comprise a fraud estimation module 160, able to estimate or detect or determine a fraud or a fraudulent transaction or a fraudulent user or an attacker or a fraudulent set-of-operations, or an attempted fraud or an attempted fraudulent transaction (which may be concurrently occurring, or which had already occurred and is now detected or estimated in retrospective review of previous operations or prior data).

System 100 may further comprise a Bot/Malware/Script Identifier 170, able to estimate or detect or determine that an electronic device or computer, or computing device, or a computerized service, is being controlled (or, is being attempted to be controlled, or attacked, or accessed, or utilized) by a "Bot" or malware or automated script or other automatic cyber-attack unit or module, rather than by a legitimate human user (or, rather than by a human user).

System 100 may further comprise one or more of the other modules, units and/or components that are described herein.

Figure 2:
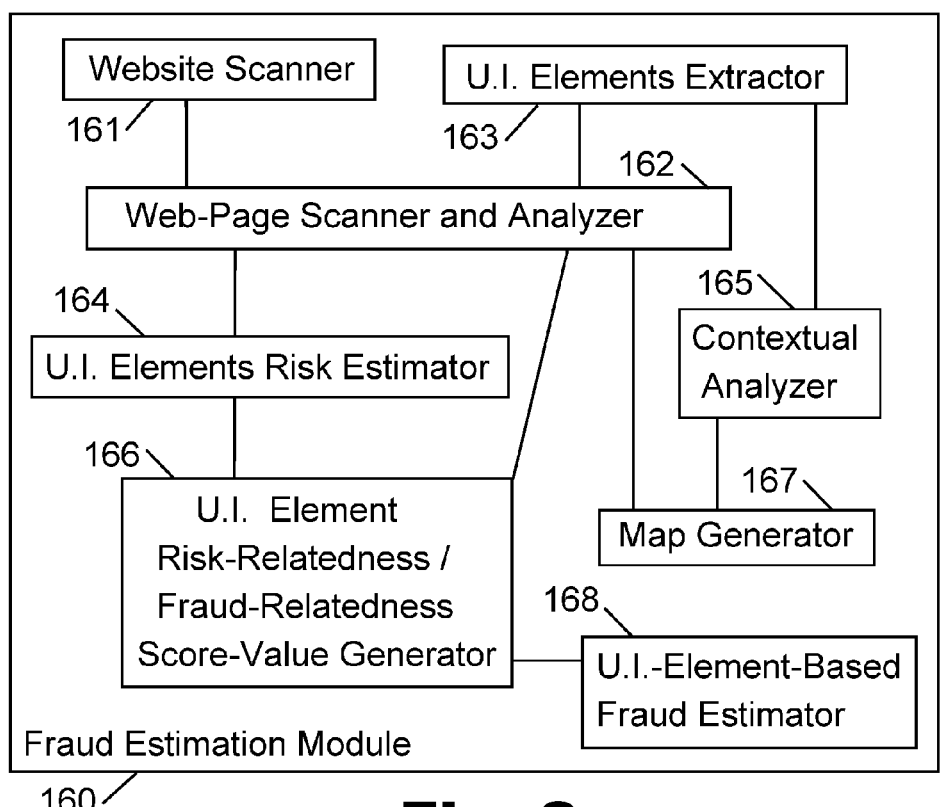
FIG. 2 is a schematic block-diagram illustration of a fraud estimation module, in accordance with some demonstrative embodiments of the present invention.

Reference is made to FIG. 2, which is a schematic block-diagram illustration of fraud estimation module 160 and its associated components, in accordance with some demonstrative embodiments of the present invention.

In accordance with some demonstrative embodiments of the present invention, fraud estimation module 160 may comprise a website scanner 161, able to scan or search or crawl or download or otherwise obtain, download and/or review an entire website (e.g., a banking website, an electronic commerce site), and able to obtain or download some or all of the web-pages of such website, or able to generate such web-pages from a dynamic script or from a source code of such website. For example, the website may be a banking website; and the website scanner 161 may crawl the entire banking website (or selected portions of the banking website), and may generate or may download a set of web-pages for further analysis. For example, the website scanner 161 may scan a banking website; and may download or generate multiple web-pages therefrom, such as, a first web-page that is used for "Contact Us", a second web-page that is used for "Find Branch Location", a third web-page that is used for "Perform Wire Transfers", a fourth web-page that is used for "See Account Details", a fifth web-page that is used for "Frequently Asked Questions", or the like.

In some embodiments of the present invention, a web-page scanner and analyzer 162 may then scan and analyze the content, data, meta-data, UI elements, GUI elements, input/output elements, links, hyperlinks, buttons, source code, and/or any other suitable data or data-items of each such web-page.

For example, a UI Elements Extractor 163 may operate in conjunction with (or as part of) the web-page scanner and analyzer 162, and may extract or identify each UI element of the web-page being analyzed; and may generate a list or a lookup table or database or other data-structure of the identified UI elements. For example, the UI Elements Extractor 163 may analyze the web-page of "Find Branch Location"; may identify each field that the user may be able to fill-out (e.g., city, zip-code), may identify each drop-down menu or radio-button or other selectable UI element (e.g., for selecting radius around a zip-code), and/or may identify any other UI elements (e.g., a "submit" or "search" button or link). Similarly, the UI Elements Extractor 163 may analyze a "Perform Wire Transfers" page; may identify a first field of "Beneficiary Name", may identify a second field of "Beneficiary Account Number", may identify a third field of "Amount to Transfer", may identify a fourth UI element of "Submit" (e.g., button for submitting the filled-out online form), or the like.

In accordance with some demonstrative embodiments of the present invention, a UI Elements Risk Estimator 164 may estimate or determine a risk or an exposure that may be associated with each one of the identified UI elements on the web-page. Optionally, a contextual analyzer 165 or other suitable module may be utilized, for example, to perform contextual analysis, semantic analysis, content-based analysis, or other suitable analysis operations; optionally utilizing a Natural Language Processing (NLP) algorithm for analyzing the content or label that is associated with (or contained in) each such UI element; and/or optionally using a comparison or a search that utilizes pre-defined keywords or triggering words or terms. Optionally, one or more databases may be utilized or searched; for example, a database may be constructed by analyzing a log of fraudulent transactions and identifying the web-page portions or components or UI elements that fraudulent users (or attackers) typically utilize or typically engage (e.g., a "Make Payment Now" button), and conversely identifying web-page components or UI elements that fraudulent users (or attackers) typically does not utilize during a fraudulent transaction or during an attack (e.g., a "Contact Us" button, or a "Branch Locator" link); and optionally, identifying web-page elements or UI elements that are "neutral", and that are sometimes used by fraudulent users as well as by legitimate users (e.g., "Show Current Account Balance" button or link). Such database(s) may be constructed by analyzing historical, known, attacks or fraudulent transactions; and may be searched, or compared to, in order to determine whether a UI element of a current web-page is fraud-related or non-fraud-related in its typical engagement.

In some embodiments of the present invention, for example, the contextual analyzer 165 may compare a label or a content of a UI element, to a first pre-defined list of high-exposure (or high-risk) terms and/or to a second pre-defined list of low-exposure (or low-risk) terms. In a demonstrative example, the first pre-defined list of high-risk terms may include, for example: "Transfer Money", "Move Funds", "Wire Transfer", "Submit Payment"; and in contrast, the second pre-defined list of low-risk terms may include, for example: "Contact Us", "Branch Locator", "Terms of Use", "Frequently Asked Questions". Optionally, a third medium-risk or medium-exposure list of terms may be used, including terms or words or keywords which are not necessarily associated with high-risk operations, but are also not entirely benign and are not entirely low-risk; such as, for example, "Show Account Balance", "Show Recent Transactions", "Show Monthly Statement".

In accordance with some embodiments of the present invention, based on the contextual analysis performed by the contextual analyzer 165, and/or based on other analysis performed by the UI Elements Risk Estimator 164 and/or by taking into account other conditions and/or other analysis results, a UI Element Risk-Relatedness/Fraud-Relatedness Score-Value Generator 166 may generate or assign or allocate a score-value to each UI element on the web-page, indicating the risk-relatedness or the fraud-relatedness or the security-exposure that is associated with user engagement of such UI element. In a demonstrative example, each list of pre-defined terms or keywords, may further include, for each term or keyword, an associated risk-value or exposure-value, which may be used if identified in the UI element or if otherwise identified as being associated with the UI element.

In a demonstrative example, risk-value or fraud-relatedness may be a number or a value in the range of 0 to 100, wherein 0 indicates "no risk/no exposure", and wherein 100 indicates "maximum risk/maximum exposure". For example, a UI element that is identified as including (or as being associated with, or as triggering) a "Contact Us" operation or page or action, may be assigned a fraud-relatedness value or a risk-value of zero or near-zero, or a very low (e.g., single-digit) score value. Similarly, a UI element that corresponds to "Branch Locator" or to "Frequently Asked Questions", may be assigned a zero or near-zero (or single-digit) risk-value or fraud-relatedness value. In contrast, a field of "Enter the Beneficiary Account Number for Wire Transfer", or a button of "Do the Wire Transfer Now", may be associated with a high risk-value or fraud-relatedness value (e.g., value of 90 or 95, out of 100). In between, medium-exposure UI elements, such as "Show Account Balance" or "Show Monthly Statement", may be assigned a medium risk-value or fraud-relatedness (e.g., value of 50 or 55, out of 100). Other suitable values and/or ranges may be used.

In some demonstrative embodiments of the present invention, a Map Generator 167 may generate a representation or a data-structure, such as a map, a "heat map", a lookup table, a list, a spreadsheet, a database, or other suitable data structure, to indicate the extracted UI elements in a webpage, and the risk-value or fraud-relatedness value of each one of the UI elements. For example, Table 1 demonstrates such a lookup table of UI elements of a particular single page in a banking website:

TABLE 1

| UI Element | Risk Relatedness or Fraud Relatedness |
| --- | --- |
| "Contact Us" button or link | 4 |
| "Branch Locator" button or link | 2 |
| "F.A.Q." button or link | 1 |
| "Show Account Balance" button or link | 49 |
| "Show Monthly Statement" button or link | 47 |
| "Perform Payment to Payee" button or link | 51 |
| "Define New Payee" button or link | 90 |
| "Perform Money Transfer" button or link | 89 |
| "Beneficiary Name" field | 92 |
| "Beneficiary Account Number" field | 87 |
| "Amount to Wire" field | 85 |
| "Send Email Confirmation" yes/no selector | 88 |
| "Submit Payment Now" button | 96 |
| "Wire the Funds Now" button | 98 |

In accordance with the present invention, a UI-Element-Based Fraud Estimator 168 may operate, in real-time as a user engages with the web-page or with UI elements, and/or in retrospect or retroactively (e.g., by reviewing and analyzing a log of previously-recorded user interactions), in order to estimate whether a particular user operation, or a set of operations, is estimated to be fraudulent, or is estimated to be associated with fraudulent behavior, or is estimated to be associated with a fraudulent user. The UI-Element-Based Fraud Estimator 168 may take into account a combination of: (i) the risk-value or fraud-relatedness value of the UI element that was engaged, and (ii) the user-specific behavioral characteristic(s) that were extracted from user interactions performed in conjunction with (or as part of) engaging that particular UI element, and/or immediately prior to engaging with that UI element (e.g., as the on-screen pointer is moved from a previous, source position, to the UI element being engaged), and/or immediately after engaging with that UI element (e.g., as the on-screen pointer is moved from that UI element to another on-screen destination). Optionally, the UI-Element-Based Fraud Estimator 168 may further take into account, for example, the user's reaction or response or remedial actions or corrective actions, that were performed (if at all performed) in reaction to an injected input-output aberration or interference or irregularity or abnormality.

In a demonstrative example, the UI-Element-Based Fraud Estimator 168 may detect that a highly-suspicious behavior has been identified in conjunction with engaging with the "Branch Locator" button; such as, that the on-screen mouse-pointer, when moving towards the "Branch Locator" button, appears to "jump" (e.g., indicating a possible Remote Access user, rather than a direct user that sits in front of a computing device), or that the mouse-pointer moves in an entirely perfect straight line (e.g., typically associated with an automatic script that moves the mouse-pointer, and not with a human user that rarely performs perfectly-linear moves). However, even though the user behavior was suspicious and appears to be fraudulent, the particular UI Element that was the subject of the user engagement is a Low Risk UI element, associated with a low (e.g., single digit) risk-value or fraud-relatedness value. Therefore, the UI-Element-Based Fraud Estimator 168 may determine that there does not exist a need to trigger a fraud alert yet.

In contrast, the UI-Element-Based Fraud Estimator 168 may detect that a partially-suspicious behavior has been identified in conjunction with engaging with the "Submit Wire Transfer Now" button; such as, that the on-screen mouse-pointer, when moving towards the "Submit Wire Transfer Now" button, appears to "jump" (e.g., indicating a possible Remote Access user, rather than a direct user that sits in front of a computing device), or that the mouse-pointer moves in an entirely perfect straight line (e.g., typically associated with an automatic script that moves the mouse-pointer, and not with a human user that rarely performs perfectly-linear moves). Accordingly, since the user behavior was suspicious or partially-suspicious, and since the subject of the user engagement is a High Risk UI element, associated with a high risk-value or high fraud-relatedness value, then the UI-Element-Based Fraud Estimator 168 may determine that there exist an immediate need to trigger a fraud alert.

In some embodiments, the fraud estimation module 160 may generate as output a binary-type determination, indicating that a particular operation, or a particular set-of-operation, or a particular transaction, or a particular engagement with one or more UI elements, is either: (I) legitimate, or (ii) fraudulent. In other embodiments, the fraud estimation module 160 may generate as output a ternary-type determination, indicating that a particular operation, or a particular set-of-operation, or a particular transaction, or a particular engagement with one or more UI elements, is either: (I) legitimate, or (ii) fraudulent, or (III) that the system does not have sufficient data in order to positively select option (I) or option (II). In still other embodiments, the fraud estimation module 160 may generate as output a fraud-probability score, indicating the estimated probability (e.g., on a scale of 0 to 100, or other suitable range of values) that a particular operation, or a particular set-of-operation, or a particular transaction, or a particular engagement with one or more UI elements, is fraudulent (or, is associated with a fraudulent transaction, or with fraudulent purposes, or with a fraudulent user). Other types of outputs or determinations or scores may be generated by the systems and methods of the present invention.

Figure 3:
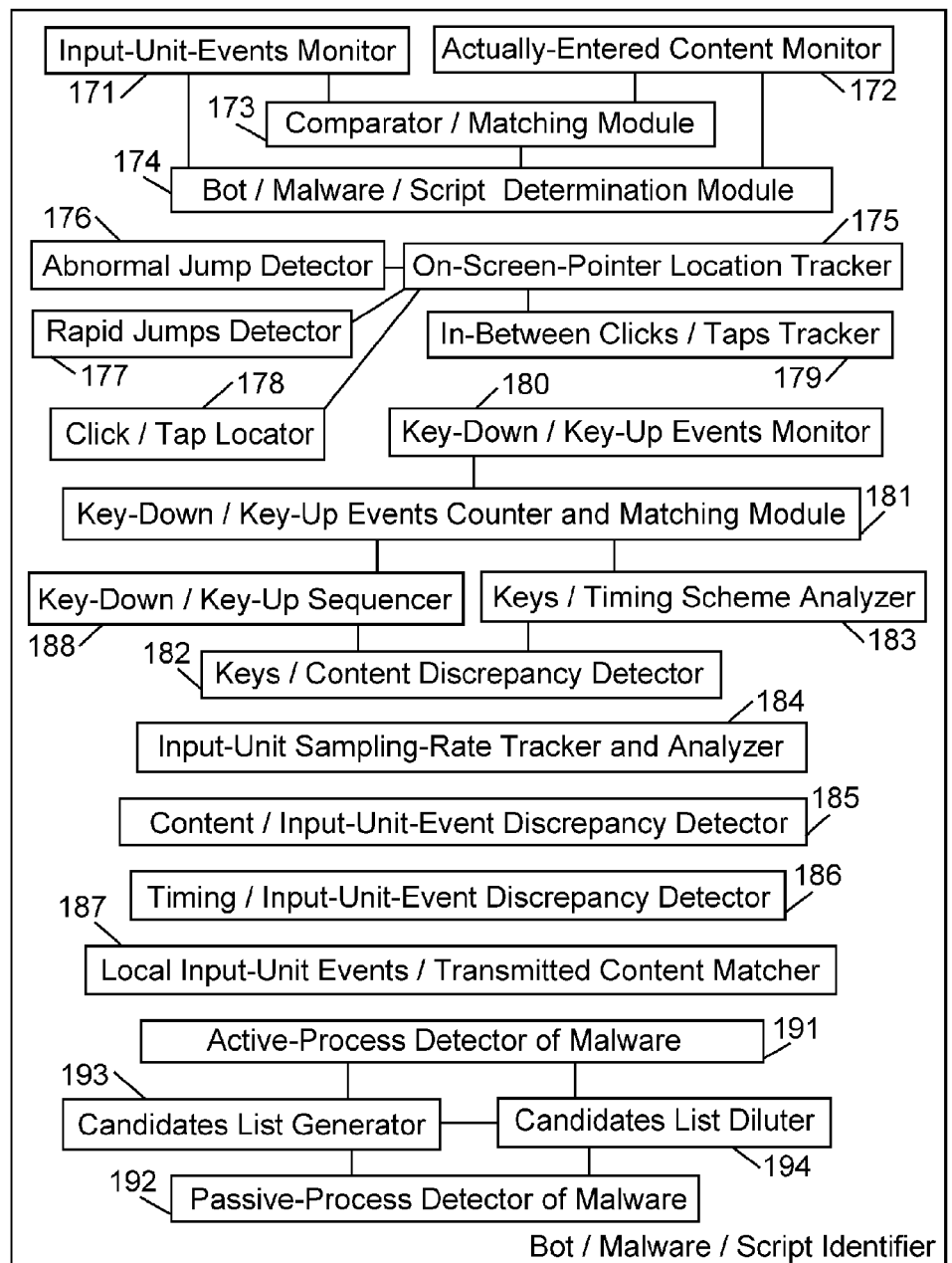
FIG. 3 is a schematic block-diagram illustration of Bot/Malware/Script Identifier and its associated components, in accordance with some demonstrative embodiments of the present invention.

Reference is made to FIG. 3, which is a schematic block-diagram illustration of Bot/Malware/Script Identifier 170 and its associated components, in accordance with some demonstrative embodiments of the present invention.

In some embodiments, for example, the Bot/Malware/Script Identifier 170 and/or its associated components may perform a method comprising: (a) monitoring input-unit events of one or more input units of an electronic device, by an Input-Unit-Events Monitor 171; (b) monitoring actual content that said electronic device receives as actual input, by an Actually-Entered Content Monitor 172; (c) detecting a mismatch between (i) the input-unit events of said electronic device, and (ii) the actual content that said electronic device received as actual input; the mismatch may be detected by a suitable Comparator/Matching Module 173; (d) based on the detecting of step (c), determining that said electronic device is more-probably controlled by an automated attacking module, and not by a legitimate human user, such detection being performed by a Bot/Malware/Script determination module 174. For example, the system may search for discrepancy or mismatch, between the number and/or the type(s) and/or the order(s) and/or the sequences(s) of input-unit events that were registered by the input-unit(s), and the actually-entered content (e.g., strings, data, field data, form data) that the electronic device reports or registers or transmits as allegedly corresponding to manually-entered input.

Optionally, the Bot/Malware/Script determination module 174 may comprise, or may utilize or may be associated with, a Statistical Analysis Unit which may perform statistical analysis of data of input-unit(s) interactions; for example, calculating average, mean, standard deviation, variance, distribution, distribution pattern(s), and/or other statistical properties of the registered or reported input-unit(s) events or gestures or data; and then, comparing them or matching them to general-population statistical properties of human-users utilization of such input-units, in order to find a mismatch or a significant deviation from human-characterizing statistical properties of human behavior. For example, determining that the keyboard exhibited an average (or median) typing speed of 650 words-per-minute, within one usage session or over multiple usage-sessions of the same user, indicates that this is non-human characteristic (e.g., as human can type at a speed of up to around 200 words-per-minute), thereby indicating that a computerized script more-probably than a human-user was responsible for entering such keyboard data. Similarly, statistical distribution of input-unit data or metadata (e.g., time-gaps between key-down/key-up events, time-gaps between typed characters, time-gaps between mouse-clicks or on-screen taps, or the like) may similarly be used for detecting non-human behavior of an automated, impostor, script or "bot". The statistical analysis may comprise, for example, comparison to threshold values; comparison to pre-defined maximum threshold value; comparison to pre-defined minimum threshold value; finding a different from threshold value(s) (e.g., determining that a statistical property that was calculated, is at least 20% less or is at least 20% more than a human-based value of such property); checking whether the calculated statistical property is within a pre-defined range of acceptable human-based values; or the like. Similarly, the Bot/Malware/Script determination module 174 may search for, and may detect, other types of abnormal behavior that does not (or cannot) characterize human utilization of an input-unit; for example, occurrence of two (or more) mouse-clicks or touchpad-taps or touch-screen taps, simultaneously or concurrently, at two (or more) different locations or on-screen locations; thereby indicating an automated "bot" or script, and not a human user.

In some embodiments, for example, the Bot/Malware/Script Identifier 170 and/or its associated components may perform: (A) by using an On-Screen-Pointer Location Tracker 175, monitoring and tracking location over time, of an on-screen pointer of said electronic device; (B) by using an Abnormal Jump Detector 176, detecting an abnormal jump of said on-screen pointer, from a first on-screen location, to a second non-adjacent screen location; (C) by using the Bot/Malware/Script determination module 174, based on detection of said abnormal jump of said on-screen-pointer, determining that said electronic device is more-probably controlled by an automated attacking module, and not by a legitimate human user. For example, the system may detect that an on-screen pointer has "jumped" from a first on-screen point or location, to a second, non-adjacent or non-consecutive, point or location (e.g., from screen location (10, 20) to screen location of (280, 310), or the like). Such abnormal jump may be detected, although a human user utilizes a mouse or touch-pad or touch-screen in a generally-continuous movement or motion or strokes; and this may indicate that a malware or automated script or "bot" has operated the device or the computerized service, rather than a human user.

In some embodiments, for example, the Bot/Malware/Script Identifier 170 and/or its associated components may perform: (A) monitoring location over time, of an on-screen pointer of said electronic device; (B) detecting an abnormal jump of said on-screen pointer, from a first on-screen location, to a second non-adjacent screen location; and further detecting that said abnormal jump does not match input-unit events of said electronic device; (C) based on detection of said abnormal jump of said on-screen-pointer, determining that said electronic device is more-probably controlled by an automated attacking module, and not by a legitimate human user. In some embodiments, the detection of an abnormal (e.g., non-adjacent) jump of the on-screen pointer, by itself, may suffice in order to generate an alert of possible-fraud; in other embodiments, such detection may trigger an alert if additional condition(s) hold true, such as, for example, if such "jump" of the on-screen pointer was not concurrently accompanied by any input-unit events, or was not accompanied by sufficient input-unit events that may indicate a human-user basis for such on-screen pointer displacement.

In some embodiments, for example, the Bot/Malware/Script Identifier 170 and/or its associated components may perform: (A) by using a Rapid Jumps Detector 177, detecting that an on-screen pointer of said electronic device exhibits rapid jumps among two or more on-screen locations, wherein said rapid jumps comprise two or more jumps that occur within a pre-defined time period; (B) based on detection of rapid jumps of said on-screen pointer, determining that said electronic device is more-probably controlled by an automated attacking module, and not by a legitimate human user. For example, the system may detect that one or more jumps, or two or more jumps, have occurred with regard to the on-screen pointer, within a pre-defined period of time (e.g., 1 second, 5 seconds, 30 seconds, K seconds); and this may base a determination of possible-fraud.

In some embodiments, detection of a single, isolated, "jump" or abnormal displacement of the on-screen pointer, suffices in order for the system to determine that possible-fraud is exhibited. In other embodiments, detection of a single, isolated, "jump" or abnormal displacement of the on-screen pointer, does not suffice in order for the system to determine that possible-fraud is exhibited; but rather, detection of at least N such (or similar) abnormal jumps is required in order to determine that possible-fraud is exhibited (e.g., N such jumps within a single usage-session, or within a single logged-in session of a user). In still other embodiments, detection of a single, isolated, "jump" or abnormal displacement of the on-screen pointer, does not suffice in order for the system to determine that possible-fraud is exhibited; but rather, detection of at least N such (or similar) abnormal jumps within a pre-defined time-frame is required in order to determine that possible-fraud is exhibited (e.g., N such jumps within a period of 1 second or 5 seconds or 30 seconds or 60 seconds or K seconds).

In some embodiments, for example, the Bot/Malware/Script Identifier 170 and/or its associated components may perform: (A) by using a Click/Tap Locator 178, detecting a first click or tap, performed at a first on-screen location; (B) subsequently, detecting a second click or tap, performed at a second on-screen location; (C) by using an In-Between Clicks/Taps Tracker 179, detecting that no input-unit events were registered between (i) detection of the first click or tap and (ii) detection of the second click or tap; (D) based on the detecting of step (C), determining that said electronic device is more-probably controlled by an automated attacking module, and not by a legitimate human user. For example, the system may detect that a first mouse-click or screen-tap was registered at screen location (30, 40); and that two seconds later, a second mouse-click or screen-tap was registered at screen location (180, 230); however, no input-unit events (e.g., no mouse-dragging, no touch-screen finger dragging, no touch-pad finger dragging) were registered during that time-interval of two seconds between the two clicks or taps; thereby indicating that a nun-human script or malware is more-probably the generator of those two clicks or taps.

In some embodiments, for example, the Bot/Malware/Script Identifier 170 and/or its associated components may perform: (A) detecting a first click or tap, performed at a first on-screen location; (B) subsequently, detecting a second click or tap, performed at a second on-screen location; (C) detecting that one or more input-unit were registered between (i) detection of the first click or tap and (ii) detection of the second click or tap; and also, determining that the one or more input-unit events, that were registered, do not suffice for displacing an on-screen pointer to displace from the first on-screen location to the second on-screen location; (D) based on the determining of step (C), determining that said electronic device is more-probably controlled by an automated attacking module, and not by a legitimate human user. For example, the system may detect that a first mouse-click or screen-tap was registered at screen location (100, 100); and that two seconds later, a second mouse-click or screen-tap was registered at screen location (130, 140), such that the diagonal distance between the two on-screen locations is 50 pixels; however, the input-unit events (e.g., mouse-dragging, touch-screen finger dragging, touch-pad finger dragging) that were registered during that time-interval of two seconds between the two clicks or taps, suffices only to an actual displacement of 24 pixels and not the reported displacement of 50 pixels diagonally; thereby indicating that a nun-human script or malware is more-probably the generator of those two clicks or taps In some embodiments, for example, the Bot/Malware/Script Identifier 170 and/or its associated components may perform: (A) by using a Key-Down/Key-Up Events Monitor 180, monitoring key-down events, and key-up events, during a usage session in which said electronic device exhibits reception of keyboard input; (B) by using a Key-Down/Key-Up Events Counter and Matching Module 181, determining that the number of key-down events does not match the number of key-up events, during said usage session; (C) based on the determining of step (B), determining that said electronic device is more-probably controlled by an automated attacking module, and not by a legitimate human user. For example, within a usage session, or within a time period associated with filling-out of a form or of a field, or within a pre-defined time period (e.g., 5 seconds, or K seconds), there may be counted 24 key-down events and only 21 key-up events; thereby indicating that a non-human malware or attacker is in charge and/or is spoofing or faking keyboard data or other input entry data.

In some embodiments, for example, the Bot/Malware/Script Identifier 170 and/or its associated components may perform: (A) monitoring key-down events, and key-up events, during a usage session in which said electronic device exhibits reception of keyboard input; (B) by using a Key-Down/Key-Up Sequencer 188, determining that the order of the key-down events and the key-up events, during said usage session, does not match an expected order of key-down events and key-up events that is expected to be observed if an input unit of said electronic device is utilized for typing by a human user; (C) based on the determining of step (B), determining that said electronic device is more-probably controlled by an automated attacking module, and not by a legitimate human user. For example, the system may determine that even though the total number of key-down events is identical (or is similar to, or close to, beyond a pre-defined threshold value or percentage) to the total number of key-up events (e.g., 24 key-down events, and 24 or 23 key-up events), still, the sequence or the ordering or the pattern of such key events does not characterize a human user entering data manually; for example, detecting that instead of alternating between a key-down event and a key-up event, the sequence of events shows a series of 7 key-down events, follows by a sequence of 5 key-up events, followed by a sequence of 12 key-down events, followed by a sequence of 3 key-up events, and so forth; thereby indicating that more-probably a non-human user is spoofing input data, or is attempting to imitate (e.g., imperfectly) manual entry of data.

In some embodiments, for example, the Bot/Malware/Script Identifier 170 and/or its associated components may perform: (A) monitoring key-down events, and key-up events, during a usage session in which said electronic device exhibits reception of keyboard input; (B) by using a Keys/Content Discrepancy Detector 182, determining that at least one of: (i) the key-down events that were registered by the electronic device during said usage session, and (ii) the key-up events that were registered by the electronic device during said usage session, does not match the number of characters that said electronic device registered as received from a keyboard; (C) based on the determining of step (B), determining that said electronic device is more-probably controlled by an automated attacking module, and not by a legitimate human user. For example, the system may detect 28 key-down events, and 28 key-up event, such that their total number match, and their sequence may be correct (e.g., alternating between key-down and key-up); however, at the same time interval, the electronic device also reported or registered or transmitted a message indicating that a total of 37 characters were allegedly typed or manually-entered, and not 24 characters as expected; thereby indicating possible fraud by an automated script or malware or "bot".

In some embodiments, for example, the Bot/Malware/Script Identifier 170 and/or its associated components may perform: (A) monitoring key-down events, and key-up events, during a usage session in which said electronic device exhibits reception of keyboard input; (B) by using a Keys/Timing Scheme Analyzer 183, determining that (I) a timing scheme that characterizes the monitored key-down events and the monitored key-up events, during said usage session, does not match (II) a timing scheme of entry of typed characters as actually registered by the electronic device; (C) based on the determining of step (B), determining that said electronic device is more-probably controlled by an automated attacking module, and not by a legitimate human user. For example, the system may detect that even though 24 key-down events and 24 key-up events were registered, their timing pattern does not match the timing pattern of actual content as entered; such that, for example, the input-unit indicates that all 24 characters were manually entered within a time-frame of three seconds using a generally-constant typing speed, whereas the electronic device and/or its applications (e.g., Web browser, native application, or the like) indicate that the manual entry of data had a different timing scheme (e.g., that a first field was filled-out within 4 seconds, then no input-unit events were registered for 7 seconds, then a second field was filled-out within 5 seconds). Such different, non-matching, timing schemes or timing patterns, may allow the system to determine or to estimate that a fraudulent malware is operating the device, rather than a legitimate human user.

In some embodiments, for example, the Bot/Malware/Script Identifier 170 and/or its associated components may perform: (A) continuously monitoring mouse events, during a usage session in which said electronic device exhibits reception of mouse-based input; (B) determining that during a first period of time within said usage session, the monitored mouse events exhibit a first sampling rate; (C) determining that during a second period of time within said usage session, the monitored mouse events exhibit a second, different, sampling rate; (D) based on the determining of steps (B) and (C), further determining that said electronic device is more-probably controlled by an automated attacking module, and not by a legitimate human user. These operations may be performed by an Input-Unit Sampling-Rate Tracker and Analyzer 184, which may monitor and track and/or identify the sampling rate of an input-unit (e.g., a mouse), and may detect that the sampling rate changes (e.g., from 40 Hz to 28 Hz) within a single usage session or within a pre-defined time-frame (e.g., within 1 minutes, or within K seconds); thereby indicating that an automated attack script is more-probably controlling (or spoofing, or replacing, or modifying, or faking) the input-unit data In some embodiments, for example, the Bot/Malware/Script Identifier 170 and/or its associated components may perform: (A) continuously monitoring keyboard events, during a usage session in which said electronic device exhibits reception of keyboard-based input; (B) determining that during a first period of time within said usage session, the monitored keyboard events exhibit a first sampling rate; (C) determining that during a second period of time within said usage session, the monitored keyboard events exhibit a second, different, sampling rate; (D) based on the determining of steps (B) and (C), further determining that said electronic device is more-probably controlled by an automated attacking module, and not by a legitimate human user. These operations may be performed by the Input-Unit Sampling-Rate Tracker and Analyzer 184, which may be adapted to monitor or track various types of input units, e.g., mouse, touch-pad, touch-screen, keyboard, or the like; and to further determine that the sampling rates of two (or more) input units do not match each other.

In some embodiments, for example, the Bot/Malware/Script Identifier 170 and/or its associated components may perform: (A) continuously monitoring keyboard events and mouse events, during a usage session in which said electronic device exhibits reception of keyboard-based input; (B) determining that during said usage session, the monitored keyboard events exhibit a first sampling rate; (C) determining that during said usage session, the monitored mouse events exhibit a second, different, sampling rate; (D) based on the determining of steps (B) and (C), further determining that said electronic device is more-probably controlled by an automated attacking module, and not by a legitimate human user. For example, a change of keyboard sampling rate, within a usage session or within a pre-defined time-frame or usage (e.g., within 10 seconds, or within K seconds), may be used as indicator or a malware or script that attempts to (imperfectly) emulate or simulate or spoof or fake keyboard-data entry.

In some embodiments, for example, the Bot/Malware/Script Identifier 170 and/or its associated components may perform: (A) detecting that an input-unit level of the electronic device reports that a message of M characters were manually entered via an input-unit of the electronic device; (B) detecting that said electronic device sends to a remote server, an outgoing message of N characters that was allegedly typed on said electronic device, wherein N is different than M; then, (C) based on the determining of steps (A) and (B), further determining that said electronic device is more-probably controlled by an automated attacking module, and not by a legitimate human user. These operations may be performed by a Content/Input-Unit-Event Discrepancy Detector 185, which may detect that even though a username (or an account number, or beneficiary name) of 12 characters was submitted by the electronic device to a remote server, the actually-registered input-unit events do not support or do not match manual entry of 12 characters, or match or support manual entry of zero characters or of 9 characters or of 17 characters, thereby indicating that an automatic script or malware may be operational and modifying (or replacing, or spoofing) data as part of an attack or cyber-attack.

In some embodiments, for example, the Bot/Malware/Script Identifier 170 and/or its associated components may perform: (A) detecting that the electronic device sends to a remote server, a message indicating that a string of characters was manually entered by a user in a particular field of a particular fillable form; (B) based on monitoring of input-unit interactions of said electronic device, determining that the input unit of the electronic device did not register any manual input during the time-period that corresponds to alleged manual data entry of said particular field of said particular fillable form; (C) based on the determining of steps (A) and (B), further determining that said electronic device is more-probably controlled by an automated attacking module, and not by a legitimate human user. For example, a Timing/Input-Unit-Event Discrepancy Detector 186 may detect that a timing scheme, or time-frame length, of manual entry of data as registered by the input unit(s), does not match or does not support (or does not suffice for; or is excess relative to) the actual content or length or timing of the message (or content, or payload) that was allegedly entered and then stored or transmitted or submitted. Additionally or alternatively, a Local Input-Unit Events/Transmitted Content Matcher 187 may detect or determine discrepancy between the content as transmitted out to a remote server, and the manual-entry of data as typed or entered locally on the electronic device (e.g., the input-unit monitoring shows that the user entered 6 characters into a username field, but an outgoing message or query from the electronic device shows that a username of 10 characters is being sent out to a remote server).

In some embodiments, for example, the Bot/Malware/Script Identifier 170 and/or its associated components may perform: (A) detecting that the electronic device sends to a remote server, a message indicating that a string of characters was manually entered by a user in a particular field of a particular fillable form; (B) based on monitoring of input-unit interactions of said electronic device, determining that the input unit of the electronic device registered manual input during the time-period that corresponds to alleged manual data entry of said particular field of said particular fillable form; and further determining that the manual input, as registered by the input unit of the electronic device, does not yield said string of characters that said message indicates as manually entered; (C) based on the determining of steps (A) and (B), further determining that said electronic device is more-probably controlled by an automated attacking module, and not by a legitimate human user. For example, even though the system detects that actual input-unit events were registered, the system may deduce that carrying-out of the registered input-unit events would not yield the alleged content that was allegedly entered manually (and then, for example, stored locally, or transmitted or submitted to a remote server).

In some embodiments, for example, the Bot/Malware/Script Identifier 170 and/or its associated components may perform: (A) by utilizing an Active-Process Detector of Malware 191, performing an active malware detection process, which comprises: injecting an input-output aberration into a web-page, and monitoring whether manual corrective actions were manually performed in response to the input-output aberration; (B) based on the active malware detection process, and by utilizing a Candidates List Generator 193, generating a list of possibly-fraudulent usage sessions in which at least one of the following conditions holds true: (I) no corrective actions were performed, or (II) corrective actions that were performed were insufficient to adequately cure the input-output aberration; then, (C) by using a Passive-Process Detector of Malware 192, performing a passive malware detection process, which comprises: searching for a mismatch between (I) input-unit events as actually registered by one or more input units of the electronic device, and (II) content that was registered by the electronic device as allegedly being manually entered; then, (D) based on the passive malware detection process, by utilizing a Candidates List Diluter 194, diluting said list of possibly-fraudulent usage sessions, by removing (or filtering-out) from said list usage sessions that do not exhibit said mismatch of step (C).

In some embodiments, for example, the Bot/Malware/Script Identifier 170 and/or its associated components may perform: (A) performing a passive malware detection process, which comprises: searching for a mismatch between (I) input-unit events as actually registered by one or more input units of the electronic device, and (II) content that was registered by the electronic device as allegedly being manually entered; (B) based on the passive malware detection process, generating a list of possibly-fraudulent usage sessions, by removing from said list usage sessions that do not exhibit said mismatch of step (A); then, (C) performing an active malware detection process, which comprises: injecting an input-output aberration into a web-page, and monitoring whether manual corrective actions were manually performed in response to the input-output aberration; then, (D) based on the active malware detection process, diluting said list of possibly-fraudulent usage sessions, by removing from said list usage sessions in which a sufficient manual corrective action was detected in response to the input-output aberration.

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, a smart-phone, a tablet, a smart-watch, and/or other suitable machines or devices.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass®); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

The term "password" as used herein may be or may comprise, for example, a password or pass-phrase or Personal Identification Number (PIN), or other data-item or secret, or other confidential data-item, which may be used for user authentication or for logging-in or sign-in of a user into an electronic device (e.g., smartphone, tablet, smart-watch, laptop computer, desktop computer) or a service (e.g., banking service or website, brokerage service or website, email account, web-mail, social network, online vendor, online merchant, electronic commerce website or application or "app"), or other data-item or string that may be used as authentication factor or authentication step (e.g., in a single-step or multiple-step authentication process), or other log-in data that may be used in order to authorized access to a privileged service and/or to a privileged location (e.g., entry into, or exit from, or passage through a gate or card-reader or turnstile), or other log-in data item that may be used in order to authorize a user to perform privileged actions (e.g., to unlock or open a device or a vehicle; to start or ignite a vehicle; to drive a vehicle).

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, web-mail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In accordance with some embodiments of the present invention, a method comprises: (A) analyzing a content of a web-page which comprises a plurality of User Interface (UI) elements that can be engaged by a user; (B) based on contextual analysis of said web-page, assigning a fraud-relatedness score-value to at least one UI element of said web-page.

In some embodiments, the method comprises: (a) identifying in said web-page a first UI element and a second UI element; (b) determining that the first UI element is a UI element that a fraudulent user typically engages in order to achieve a fraudulent result; (c) determining that the second UI element is a UI element that a fraudulent user typically does not engage; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a fraudulent user, would cause monetary damage to a genuine account owner associated with said web-page; (c) determining that the second UI element is a UI element that, if engaged by a fraudulent user, would not cause monetary damage; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, enables the user to purchase goods or services; (c) determining that the second UI element is a UI element that, if engaged by a fraudulent user, performs an operation other than purchase of goods or services; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, enables the user to perform an electronic payment; (c) determining that the second UI element is a UI element that, if engaged by a fraudulent user, performs an operation other than an electronic payment; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, creates a potential security risk to an administrator of said web-page; (c) determining that the second UI element is a UI element that, if engaged by a fraudulent user, does not create a potential security risk to an administrator of said web-page; (d) assigning to the first UI element a first fraud-relatedness score-value, and assigning to the second UI element a second, lower, fraud-relatedness score-value.

In some embodiments, the method comprises: generating a security-exposure map of UI elements of said web-page, by generating a first indication that user-engagement with a first particular UI element on said web-page creates a potential security risk for an administrator of said web-page, and by generating a second indication that user-engagement with a second particular UI element on said web-page does not create a potential security risk for the administrator of said web-page.

In some embodiments, the method comprises: (i) detecting that a user engages the first particular UI element on said web-page which creates a potential security risk for an administrator of said web-page; (ii) in response to said detecting of step (i), generating a possible-fraud notification.

In some embodiments, the method comprises: (i) detecting that a user engages the first particular UI element on said web-page which creates a potential security risk for an administrator of said web-page; (ii) extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: (i) detecting that a user engages the first particular UI element on said web-page which creates a potential security risk for an administrator of said web-page; (ii) injecting an input-output aberration to said web-page; monitoring user interactions in response to said input-output aberration; and extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: generating a fraud-exposure map of UI elements of said web-page, by generating a first indication that user-engagement with a first particular UI element on said web-page creates a potential fraud risk for an administrator of said web-page, and by generating a second indication that user-engagement with a second particular UI element on said web-page does not create a potential fraud risk for the administrator of said web-page.

In some embodiments, the method comprises: (i) detecting that a user engages the first particular UI element on said web-page which creates a potential fraud risk for an administrator of said web-page; (ii) extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: (i) detecting that a user engages the first particular UI element on said web-page which creates a potential fraud risk for an administrator of said web-page; (ii) injecting an input-output aberration to said web-page; monitoring user interactions in response to said input-output aberration; and extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, said web-page is an HTML-based page that is accessible through a web browser.

In some embodiments, said web-page is a component of a native mobile application.

In some embodiments, a system comprises: a web-page analyzer to analyze a content of a web-page which comprises a plurality of User Interface (UI) elements that can be engaged by a user; a contextual analysis module to perform contextual analysis of said web-page; a fraud-relatedness score-value generator, to generate a fraud-relatedness score-value to at least one UI element of said web-page; wherein the web-page analyzer is: (a) to identify in said web-page a first UI element and a second UI element; (b) to determine that the first UI element is a UI element that a fraudulent user typically engages in order to achieve a fraudulent result; (c) to determine that the second UI element is a UI element that a fraudulent user typically does not engage; (d) to assign to the first UI element a first fraud-relatedness score-value, and to assign to the second UI element a second, lower, fraud-relatedness score-value.

In some embodiments, the system comprises: a web-page heat-map generator to generate a heat-map for said web-page, wherein the heat-map indicates which particular UI elements of said web-page are typically engaged by cyber-attackers, and which other UI elements of said web-page are typically not engaged by cyber-attackers.

In some embodiments, the system comprises: a UI-element-based fraud estimation module, to determine whether an engagement of a particular user with a particular UI element is fraudulent, based on both: (I) a fraud-related score-value that was generated for said particular UI element, and (II) user-specific characteristics that are extracted from input-unit interactions performed by said particular user in conjunction with engagement with said particular UI element.

In some embodiments, the system comprises: a UI-element-based fraud estimation module, to determine whether an engagement of a particular user with a particular UI element is fraudulent, based cumulatively on: (I) a fraud-related score-value that was generated for said particular UI element, and (II) user-specific characteristics that are extracted from input-unit interactions performed by said particular user in conjunction with engagement with said particular UI element, and (III) reaction of said particular user to an input-output aberration that is introduced to said web-page and which causes an irregularity in input-output interactions on said web-page.

Some embodiments of the present invention may comprise devices, systems, and methods of contextual mapping of web-page elements and other User Interface elements; for example, for the purpose of differentiating between fraudulent transactions and legitimate transactions, and/or for the purpose of distinguishing between a fraudulent user and a legitimate user. For example, User Interface (UI) elements of a website or webpage or application or other computerized service, are contextually analyzed. A first User Interface element is assigned a low fraud-relatedness score-value, since user engagement with the first User Interface element does not create a security risk or a monetary exposure. A second, different, User Interface element is assigned a high fraud-relatedness score-value, since user engagement with the second User Interface element creates a security risk or a monetary exposure. The fraud-relatedness score-values are taken into account, optionally together with user-specific behavioral characteristics, in order to determine whether to generate a possible-fraud notification, or as part of generating a possible-fraud score for a particular set-of-operations.

The present invention may include, for example, systems, devices, and methods for contextual mapping and/or contextual analysis of web-pages or websites or applications, as well as generating fraud-relatedness score-values which may then be utilized for estimating or determining a possible-fraud score, or for determining whether a transaction or a set-of-operations is estimated to be fraudulent.

The present invention may include devices, systems, and methods of contextual mapping of web-page elements and other User Interface elements, for the purpose of differentiating between fraudulent transactions and legitimate transactions, or for the purpose of distinguishing between a fraudulent user and a legitimate user. For example, User Interface elements of a website or webpage or application or other computerized service, are contextually analyzed. A first User Interface element is assigned a low fraud-relatedness score-value, since user engagement with the first User Interface element does not create a security risk or a monetary exposure. A second, different, User Interface element is assigned a high fraud-relatedness score-value, since user engagement with the second User Interface element creates a security risk or a monetary exposure. The fraud-relatedness score-values are taken into account, together with user-specific behavioral characteristics, in order to determine whether to generate a possible-fraud notification, or as part of generating a possible-fraud score for a particular set-of-operations.

In accordance with some demonstrative embodiments of the present invention, a method comprises: (A) detecting an automated malware that emulates human interactions with an input-unit of an electronic device; wherein the detecting of step (A) comprises: (a) monitoring input-unit interactions of said electronic device; (b) analyzing said input-unit interactions; (c) determining that it is impossible for a human user to perform said input-user interactions; (d) based on the determining of step (c), determining that said input-unit interactions were more-probably performed by said automated script that emulates human interactions, and not by a human user.

In some embodiments, the method and/or particularly steps (b) and (c) and (d), may comprise: detecting that said input-unit interactions comprise an on-screen displacement-jump of an on-screen pointer, from a first on-screen location, to a second and non-adjacent on-screen location; based on said on-screen displacement-jump of the on-screen pointer, determining that said input-unit interactions were more-probably performed by said automated script that emulates human interactions, and not by a human user.

In some embodiments, the method and/or particularly steps (b) and (c) and (d), may comprise: detecting that said input-unit interactions comprise an on-screen displacement-jump of an on-screen pointer, from a first on-screen location, to a second and non-adjacent on-screen location; and further detecting that said on-screen displacement-jump is not accompanied by any input-user gesture that is required for commanding said displacement-jump; based on said on-screen displacement-jump of the on-screen pointer, determining that said input-unit interactions were more-probably performed by said automated script that emulates human interactions, and not by a human user.

In some embodiments, the method and/or particularly steps (b) and (c) and (d), may comprise: detecting that said input-unit interactions comprise an on-screen displacement-jump of an on-screen pointer, from a first on-screen location, to a second and non-adjacent on-screen location; and further detecting that said on-screen displacement-jump is accompanied by one or more input-user gestures that are insufficient for commanding said displacement-jump; based on said on-screen displacement-jump of the on-screen pointer, determining that said input-unit interactions were more-probably performed by said automated script that emulates human interactions, and not by a human user.

In some embodiments, the method and/or particularly steps (b) and (c) and (d), may comprise: (i) detecting that said input-unit interactions comprise an on-screen displacement-jump of an on-screen pointer, from a first on-screen location, to a second and non-adjacent on-screen location;

and further determining that said on-screen displacement-jump of the on-screen pointer does not match statistical distribution of input-unit utilization by human users; (ii) based on step (i), determining that said input-unit interactions were more-probably performed by said automated script that emulates human interactions, and not by a human user.

In some embodiments, the method and/or particularly steps (b) and (c) and (d), may comprise: (i) detecting that said input-unit interactions exhibit rapid displacement-jumps of an on-screen pointer, among non-adjacent on-screen locations, wherein said rapid displacement-jumps comprise two or more on-screen pointer displacement-jumps that occur within a pre-defined time period; (ii) based on step (i), determining that said input-unit interactions were more-probably performed by said automated script that emulates human interactions, and not by a human user.

In some embodiments, the method and/or particularly steps (b) and (c) and (d), may comprise: (i) detecting a first click or tap, performed at a first on-screen location; (ii) subsequently, detecting a second click or tap, performed at a second on-screen location; (iii) detecting that no input-unit events were registered between (I) detection of the first click or tap at the first on-screen location, and (II) detection of the second click or tap at the second on-screen location; (iv) based on step (iii), determining that said input-unit interactions were more-probably performed by said automated script that emulates human interactions, and not by a human user.

In some embodiments, the method and/or particularly steps (b) and (c) and (d), may comprise: (i) detecting a first click or tap, performed at a first on-screen location, occurred concurrently with a second click or tap performed at a second, different, on-screen location; (ii) based on step (i), determining that said input-unit interactions were more-probably performed by said automated script that emulates human interactions, and not by a human user.

In some embodiments, the method and/or particularly steps (b) and (c) and (d), may comprise: (i) monitoring key-down events, and key-up events, during a usage session in which said electronic device exhibits reception of keyboard input; (ii) determining that the number of key-down events does not match the number of key-up events, during said usage session; (iii) based on step (ii), determining that said input-unit interactions were more-probably performed by said automated script that emulates human interactions, and not by a human user.

In some embodiments, the method and/or particularly steps (b) and (c) and (d), may comprise: (i) monitoring key-down events, and monitoring key-up events, during a usage session in which said electronic device exhibits reception of keyboard input; (ii) determining that the order of the key-down events and the key-up events, during said usage session, does not match an expected order of key-down events and key-up events that is expected to be observed if an input unit of said electronic device is utilized for typing by a human user; (iii) based on step (ii), determining that said input-unit interactions were more-probably performed by said automated script that emulates human interactions, and not by a human user.

In some embodiments, the method and/or particularly steps (b) and (c) and (d), may comprise: (i) monitoring key-down events, and monitoring key-up events, during a usage session in which said electronic device exhibits reception of keyboard input; (ii) determining that at least one of: (I) the key-down events that were registered by the electronic device during said usage session, and (II) the key-up events that were registered by the electronic device during said usage session, does not match the number of characters that said electronic device registered as received from a keyboard; (iii) based on the determining of step (i), determining that said electronic device is more-probably controlled by an automated attacking module, and not by a legitimate human user.

In some embodiments, the method and/or particularly steps (b) and (c) and (d), may comprise: (i) monitoring key-down events, and monitoring key-up events, during a usage session in which said electronic device exhibits reception of keyboard input; (ii) determining that (I) a timing scheme that characterizes the monitored key-down events and the monitored key-up events, during said usage session, does not match (II) a timing scheme of entry of typed characters as actually registered by the electronic device; (iii) based on the determining of step (i), determining that said electronic device is more-probably controlled by an automated attacking module, and not by a legitimate human user.

In some embodiments, the method and/or particularly steps (b) and (c) and (d), may comprise: (i) continuously monitoring mouse events, during a usage session in which said electronic device exhibits reception of mouse-based input; (ii) determining that during a first period of time within said usage session, the monitored mouse events exhibit a first sampling rate; (iii) determining that during a second period of time within said usage session, the monitored mouse events exhibit a second, different, sampling rate; (iv) based on steps (ii) and (iii), determining that said electronic device is more-probably controlled by an automated attacking module, and not by a legitimate human user.

In some embodiments, the method and/or particularly steps (b) and (c) and (d), may comprise: (i) continuously monitoring keyboard events, during a usage session in which said electronic device exhibits reception of keyboard-based input; (ii) determining that during a first period of time within said usage session, the monitored keyboard events exhibit a first sampling rate; (iii) determining that during a second period of time within said usage session, the monitored keyboard events exhibit a second, different, sampling rate; (iv) based on steps (ii) and (iii), determining that said electronic device is more-probably controlled by an automated attacking module, and not by a legitimate human user.

In some embodiments, the method and/or particularly steps (b) and (c) and (d), may comprise: (i) continuously monitoring keyboard events and mouse events, during a usage session in which said electronic device exhibits reception of keyboard-based input; (ii) determining that during said usage session, the monitored keyboard events exhibit a first sampling rate; (iii) determining that during said usage session, the monitored mouse events exhibit a second, different, sampling rate; (iv) based on steps (ii) and (iii), determining that said electronic device is more-probably controlled by an automated attacking module, and not by a legitimate human user.

In some embodiments, the method and/or particularly steps (b) and (c) and (d), may comprise: (i) detecting that an input-unit level of the electronic device reports that a message of M characters were manually entered via an input-unit of the electronic device; (ii) detecting that said electronic device sends to a remote server, an outgoing message of N characters that was allegedly typed on said electronic device, wherein N is different than M; (iii) based on the determining of steps (i) and (ii), further determining that said electronic device is more-probably controlled by an automated attacking module, and not by a legitimate human user.

In some embodiments, the method and/or particularly steps (b) and (c) and (d), may comprise: (i) detecting that the electronic device sends to a remote server, a message indicating that a string of characters was manually entered by a user in a particular field of a particular fillable form; (ii) based on monitoring of input-unit interactions of said electronic device, determining that the input unit of the electronic device did not register any manual input during the time-period that corresponds to alleged manual data entry of said particular field of said particular fillable form; (iii) based on the determining of step (ii), further determining that said electronic device is more-probably controlled by an automated attacking module, and not by a legitimate human user.

In some embodiments, the method and/or particularly steps (b) and (c) and (d), may comprise: (i) detecting that the electronic device sends to a remote server, a message indicating that a string of characters was manually entered by a user in a particular field of a particular fillable form; (ii) based on monitoring of input-unit interactions of said electronic device, determining that the input unit of the electronic device registered manual input during the time-period that corresponds to alleged manual data entry of said particular field of said particular fillable form; and further determining that the manual input, as registered by the input unit of the electronic device, does not yield said string of characters that said message indicates as manually entered; (iii) based on the determining of steps (i) and (ii), further determining that said electronic device is more-probably controlled by an automated attacking module, and not by a legitimate human user.

In some embodiments, the method and/or particularly steps (b) and (c) and (d), may comprise: (i) performing an active process of malware detection, which comprises: injecting an input-output aberration into a web-page, and monitoring whether manual corrective actions were manually performed in response to the input-output aberration; (ii) based on the active process of malware detection, generating a list of possibly-fraudulent usage sessions in which at least one of the following conditions holds true: (I) no corrective actions were performed, or (II) corrective actions that were performed were insufficient to adequately cure the input-output aberration; (iii) performing a passive process of malware detection, which comprises: searching for a mismatch between (I) input-unit events as actually registered by one or more input units of the electronic device, and (II) content that was registered by the electronic device as allegedly being manually entered; (iv) based on the passive process of malware detection, diluting said list of possibly-fraudulent usage sessions, by removing from said list usage sessions that do not exhibit said mismatch of step (iii).

In some embodiments, the method and/or particularly steps (b) and (c) and (d), may comprise: (i) performing a passive process of malware detection, which comprises: searching for a mismatch between (I) input-unit events as actually registered by one or more input units of the electronic device, and (II) content that was registered by the electronic device as allegedly being manually entered; then, (ii) based on the passive process of malware detection, generating a list of possibly-fraudulent usage sessions, by removing from said list usage sessions that do not exhibit said mismatch of step (i); then, (iii) performing an active process of malware detection, which comprises: injecting an input-output aberration into a web-page, and monitoring whether manual corrective actions were manually performed in response to the input-output aberration; then, (iv) based on the active process of malware detection, diluting said list of possibly-fraudulent usage sessions, by removing from said list usage sessions in which a sufficient manual corrective action was detected in response to the input-output aberration.

In some embodiments, a system may comprise: a fraud detection unit to detect an automated malware that emulates human interactions with an input-unit of an electronic device; wherein the fraud detection unit is configured to: (a) monitor input-unit interactions of said electronic device; (b) statistically analyze said input-unit interactions; (c) determine that a statistical characteristic of said input-user interactions, does not match statistical properties of human-users input-unit interactions; (d) based on step (c), to determine that said input-unit interactions were more-probably performed by said automated script that emulates human interactions, and not by a human user.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   (A) detecting an automated malware that emulates human interactions with an input-unit of an electronic device;
      wherein the detecting of step (A) comprises:
   (a) monitoring input-unit interactions of said electronic device;
   (b) analyzing said input-unit interactions;
   (c) determining that it is impossible for a human user to perform said input-user interactions;
   (d) based on the determining of step (c), determining that said input-unit interactions were more-probably performed by said automated script that emulates human interactions, and not by a human user,
      wherein the method comprises:
   (i) performing a passive process of malware detection, which comprises: searching for a mismatch between (I) input-unit events as actually registered by one or more input units of the electronic device and (II) content that was registered by the electronic device as allegedly being manually entered;
   (ii) based on the passive process of malware detection, generation a list of possibly-fraudulent usage sessions , by removing from said list usage sessions that do not exhibit said mismatch of step (i) above;
   (iii) performing an active process of malware detection, which comprises: injecting an input-output aberration into a web-page, and monitoring, whether manual corrective actions were manually, performed in response to the input-output aberration;

(iv) based on the active process of malware detection, diluting said list of possibly-fraudulent usage sessions, by removing from said list usage sessions in which a sufficient manual corrective action was detected in response to the input-output aberration;

wherein the method is implemented by a hardware machine that comprises at least a hardware processor and a storage unit.

2. The method of claim 1, wherein steps (b) and (c) and (d) comprise:

detecting that said input-unit interactions comprise an on-screen displacement-jump of an on-screen pointer, from a first on-screen location, to a second and non-adjacent on-screen location;

based on said on-screen displacement-jump of the on-screen pointer, determining that said input-unit interactions were more-probably performed by said automated script that emulates human interactions, and not by a human user.

3. A method comprising:

(A) detecting an automated malware that emulates human interactions with an input-unit of an electronic device; wherein the detecting of step (A) comprises:

(a) monitoring input-unit interactions of said electronic device;

(b) analyzing said input-unit interactions;

(c) determining that it is impossible for a human user to perform said input-user interactions;

(d) based on the determining of step (c), determining that said input-unit interactions were more-probably performed by said automated script that emulates human interactions, and not by a human user, wherein the method comprises:

(i) performing an active process of malware detection, which comprises: injecting an input-output aberration into a web-page, and monitoring whether manual corrective actions were manually performed in response to the input-output aberration;

(ii) based on the active process of malware detection, generating a list of possibly-fraudulent usage sessions in which at least one of the following conditions holds true: (I) no corrective actions were performed, or (II) corrective actions that were performed were insufficient to adequately cure the input-output aberration;

(iii) performing a passive process of malware detection, which comprises: searching for a mismatch between (I) input-unit events as actually registered by one or more input units of the electronic device, and (II) content that was registered by the electronic device as allegedly being manually entered;

(iv) based on the passive process of malware detection, diluting said list of possibly-fraudulent usage sessions, by removing usage sessions that do not exhibit said mismatch of step (iii) above, where the method is implementable in a machine that comprises at least a hardware processor and a memory unit.

4. The method of claim 1, wherein steps (b) and (c) and (d) comprise:

detecting that said input-unit interactions comprise an on-screen displacement-jump of an on-screen pointer, from a first on-screen location, to a second and non-adjacent on-screen location; and further detecting that said on-screen displacement-jump is accompanied by one or more input-user gestures that are insufficient for commanding said displacement-jump;

based on said on-screen displacement-jump of the on-screen pointer, determining that said input-unit interactions were more-probably performed by said automated script that emulates human interactions, and not by a human user.

5. The method of claim 3, wherein steps (b) and (c) and (d) comprise:

(i) detecting that said input-unit interactions comprise an on-screen displacement-jump of an on-screen pointer, from a first on-screen location, to a second and non-adjacent on-screen location; and further determining that said on-screen displacement-jump of the on-screen pointer does not match statistical distribution of input-unit utilization by human users;

(ii) based on step (i), determining that said input-unit interactions were more-probably performed by said automated script that emulates human interactions, and not by a human user.

6. The method of claim 1, wherein steps (b) and (c) and (d) comprise:

(i) detecting that said input-unit interactions exhibit rapid displacement-jumps of an on-screen pointer, among non-adjacent on-screen locations, wherein said rapid displacement-jumps comprise two or more on-screen pointer displacement-jumps that occur within a pre-defined time period;

(ii) based on step (i), determining that said input-unit interactions were more-probably performed by said automated script that emulates human interactions, and not by a human user.

7. The method of claim 1, wherein steps (b) and (c) and (d) comprise:

(i) detecting a first click or tap, performed at a first on-screen location;

(ii) subsequently, detecting a second click or tap, performed at a second on-screen location;

detecting that no input-unit events were registered between (I) detection of the first click or tap at the first on-screen location, and (II) detection of the second click or tap at the second on-screen location;

(iv) based on step (iii), determining that said input-unit interactions were more-probably performed by said automated script that emulates human interactions, and not by a human user.

8. The method of claim 3, wherein steps (b) and (c) and (d) comprise:

(i) detecting a first click or tap, performed at a first on-screen location, occurred concurrently with a second click or tap performed at a second, different, on-screen location;

(ii) based on step (i), determining that said input-unit interactions were more-probably performed by said automated script that emulates human interactions, and not by a human user.

9. The method of claim 1, wherein steps (b) and (c) and (d) comprise:

(i) monitoring key-down events, and key-up events, during a usage session in which said electronic device exhibits reception of keyboard input;

(ii) determining that the number of key-down events does not match the number of key-up events, during said usage session;

(iii) based on step (ii), determining that said input-unit interactions were more-probably performed by said automated script that emulates human interactions, and not by a human user.

10. The method of claim 3 wherein steps (b) and (c) and (d) comprise:
   (i) monitoring key-down events, and monitoring key-up events, during a usage session in which said electronic device exhibits reception of keyboard input;
   (ii) determining that the order of the key-down events and the key-up events, during said usage session, does not match an expected order of key-down events and key-up events that is expected to be observed if an input unit of said electronic device is utilized for typing by a human user;
   (iii) based on step (ii), determining that said input-unit interactions were more-probably performed by said automated script that emulates human interactions, and not by a human user.

11. The method of claim 1, wherein steps (b) and (c) and (d) comprise:
   (i) monitoring key-down events, and monitoring key-up events, during a usage session in which said electronic device exhibits reception of keyboard input;
   (ii) determining that at least one of: (I) the key-down events that were registered by the electronic device during said usage session, and (II) the key-up events that were registered by the electronic device during said usage session, does not match the number of characters that said electronic device registered as received from a keyboard;
   (iii) based on the determining of step (i), determining that said electronic device is more-probably controlled by an automated attacking module, and not by a legitimate human user.

12. The method of claim 3, wherein steps (b) and (c) and (d) comprise:
   (i) monitoring key-down events, and monitoring key-up events, during a usage session in which said electronic device exhibits reception of keyboard input;
   (ii) determining that (I) a timing scheme that characterizes the monitored key-down events and the monitored key-up events, during said usage session, does not match (II) a timing scheme of entry of typed characters as actually registered by the electronic device;
   (iii) based on the determining of step (i), determining that said electronic device is more-probably controlled by an automated attacking module, and not by a legitimate human user.

13. The method of claim 1, wherein steps (b) and (c) and (d) comprise:
   continuously monitoring mouse events, during a usage session in which said electronic device exhibits reception of mouse-based input;
   (ii) determining that during a first period of time within said usage session, the monitored mouse events exhibit a first sampling rate;
   (iii) determining that during a second period of time within said usage session, the monitored mouse events exhibit a second, different, sampling rate;
   (iv) based on steps (ii) and (iii), determining that said electronic device is more-probably controlled by an automated attacking module, and not by a legitimate human user.

14. The method of claim 1, wherein steps (b) and (c) and (d) comprise:
   (i) continuously monitoring keyboard events, during a usage session in which said electronic device exhibits reception of keyboard-based input;
   (ii) determining that during a first period of time within said usage session, the monitored keyboard events exhibit a first sampling rate;
   (iii) determining that during a second period of time within said usage session, the monitored keyboard events exhibit a second, different, sampling rate;
   (iv) based on steps (ii) and (iii), determining that said electronic device is more-probably controlled by an automated attacking module, and not by a legitimate human user.

15. The method of claim 3, wherein steps (b) and (c) and (d) comprise:
   (i) continuously monitoring keyboard events and mouse events, during a usage session in which said electronic device exhibits reception of keyboard-based input;
   (ii) determining that during said usage session, the monitored keyboard events exhibit a first sampling rate;
   (iii) determining that during said usage session, the monitored mouse events exhibit a second, different, sampling rate;
   (iv) based on steps (ii) and (iii), determining that said electronic device is more-probably controlled by an automated attacking module, and not by a legitimate human user.

16. The method of claim 1, wherein steps (b) and (c) and (d) comprise;
   (i) detecting that an input-unit level of the electronic device reports that a message of M characters were manually entered via an input-unit of the electronic device;
   (ii) detecting that said electronic device sends to a remote server, an outgoing message of N characters that was allegedly typed on said electronic device, wherein N is different than M;
   (iii) based on the determining of steps (i) and (ii), further determining that said electronic device is more-probably controlled by an automated attacking module, and not by a legitimate human user.

17. The method of claim 1, wherein steps (b) and (c) and (d) comprise:
   (i) detecting that the electronic device sends to a remote server, a message indicating that a string of characters was manually entered by a user in a particular field of a particular fillable form;
   (ii) based on monitoring of input-unit interactions of said electronic device, determining that the input unit of the electronic device did not register any manual input during the time-period that corresponds to alleged manual data entry of said particular field of said particular fillable form;
   (iii) based on the determining of step (ii), further determining that said electronic device is more-probably controlled by an automated attacking module, and not by a legitimate human user.

18. The method of claim 3 comprising
   (i) detecting that the electronic device sends to a remote server, a message indicating that a string of characters was manually entered by a user in a particular field of a particular finable form;
   (ii) based on monitoring of input-unit interactions of said electronic device, determining that the input unit of the electronic device registered manual input during the time-period that corresponds to alleged manual data entry of said particular field of said particular fillable form; and further determining that the manual input, as registered by the input unit of the electronic device, does not yield said string of characters that said message indicates as manually entered;

(iii) based on steps (i) and (ii), further determining that said electronic device is more-probably controlled by an automated attacking module, and not by a legitimate human user.

19. The method of claim 3, wherein steps (b) and (c) and (d) comprise:

detecting that said input-unit interactions comprise an on-screen displacement-jump of an on-screen pointer, from a first on-screen location, to a second and non-adjacent on-screen location; and further detecting that said on-screen displacement-jump is not accompanied by any input-user gesture that is required for commanding said displacement-jump;

based on said on-screen displacement-jump of the on-screen pointer, determining that said input-unit interactions were more-probably performed by said automated script that emulates human interactions, and not by a human user.

20. A non-transitory storage medium having stored thereon instructions that, when executed by a machine that comprises at least a hardware processor, cause said hardware processor to perform a method comprising:

(A) detecting an automated malware that emulates human interactions with an input-unit of an electronic device; wherein the detecting of step (A) comprises:

(a) monitoring input-unit interactions of said electronic device;

(b) analyzing said input-unit interactions;

(c) determining that it is impossible for a human user to perform said input-user interactions;

(d) based on the determining of step (c), determining that said input-unit interactions were more-probably performed by said automated script that emulates human interactions, and not by a human user, wherein the method comprises:

(i) performing a passive process of malware detection, which comprises: searching for a mismatch between (I) input-unit events as actually registered by one or more input units of the electronic device, and (II) content that was registered by the electronic device as allegedly being manually entered;

(ii) based on the passive process of malware detection, generating a list of possibly-fraudulent usage sessions, by removing from said list usage sessions that do not exhibit said mismatch of step (i) above;

(iii) performing an active process of malware detection, which comprises: injecting an input-output aberration into a web-page, and monitoring whether manual corrective actions were manually performed in response to the input-output aberration;

(iv) based on the active process of malware detection, diluting said list of possibly-fraudulent usage sessions, by removing from said list usage sessions in which a sufficient manual corrective action was detected in response to the input-output aberration.

21. A non-transitory storage medium having stored thereon instructions that, when executed by a machine that comprises at least a hardware processor, cause said hardware processor to perform a method comprising:

(A) detecting an automated malware that emulates human interactions with an input-unit of an electronic device; wherein the detecting of step (A) comprises:

(a) monitoring input-unit interactions of said electronic device;

(b) analyzing said input-unit interactions;

(c) determining that it is impossible for a human user to perform said input-user interactions;

(d) based on the determining of step (c), determining that said input-unit interactions were more-probably performed by said automated script that emulates human interactions, and not by a human user, wherein the method comprises:

(i) performing an active process of malware detection, which comprises: injecting an input-output aberration into a web-page, and monitoring whether manual corrective actions were manually performed in response to the input-output aberration;

(ii) based on the active process of malware detection, generating a list of possibly-fraudulent usage sessions in which at least one of the following conditions holds true: (I) no corrective actions were performed, or (II) corrective actions that were performed were insufficient to adequately cure the input-output aberration;

(iii) performing a passive process of malware detection, which comprises: searching for a mismatch between (I) input-unit events as actually registered by one or more input units of the electronic device, and (II) content that was registered by the electronic device as allegedly being manually entered;

(iv) based on the passive process of malware detection, diluting said list of possibly-fraudulent usage sessions, by removing usage sessions that do not exhibit said mismatch of step (iii) above.

* * * * *